United States Patent
Takano et al.

(10) Patent No.: US 11,031,591 B2
(45) Date of Patent: *Jun. 8, 2021

(54) POLYSILSESQUIOXANE COVERED SILICON NANOPARTICLES OR CALCINED PRODUCT THEREOF AND PRODUCTION METHOD THEREOF, NEGATIVE ELECTRODE ACTIVE MATERIAL FOR LITHIUM ION BATTERY, NEGATIVE ELECTRODE FOR LITHIUM ION BATTERY AND LITHIUM ION BATTERY

(71) Applicants: JNC CORPORATION, Tokyo (JP); JNC PETROCHEMICAL CORPORATION, Tokyo (JP)

(72) Inventors: Yoshihito Takano, Chiba (JP); Tetsuro Kizaki, Chiba (JP); Hirotsuna Yamada, Chiba (JP); Masakazu Kondo, Chiba (JP); Akira Takahashi, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 117 days.

This patent is subject to a terminal disclaimer.

(21) Appl. No.: 16/477,201

(22) PCT Filed: Jan. 10, 2018

(86) PCT No.: PCT/JP2018/000348
§ 371 (c)(1),
(2) Date: Jul. 11, 2019

(87) PCT Pub. No.: WO2018/131608
PCT Pub. Date: Jul. 19, 2018

(65) Prior Publication Data
US 2019/0363354 A1    Nov. 28, 2019

(30) Foreign Application Priority Data

Jan. 11, 2017 (JP) .............................. JP2017-002955

(51) Int. Cl.
*H01M 4/36* (2006.01)
*H01M 4/38* (2006.01)
(Continued)

(52) U.S. Cl.
CPC ............. *H01M 4/366* (2013.01); *C01B 33/02* (2013.01); *H01M 4/386* (2013.01); *H01M 4/604* (2013.01);
(Continued)

(58) Field of Classification Search
CPC ...... H01M 4/366; H01M 4/386; H01M 4/485; H01M 4/604; H01M 2004/021;
(Continued)

(56) References Cited

U.S. PATENT DOCUMENTS

2011/0171378 A1* 7/2011 Masaoka ................... C09C 1/36
427/216

FOREIGN PATENT DOCUMENTS

JP    S62090863    4/1987
JP    2004071542    3/2004
(Continued)

OTHER PUBLICATIONS

English translation of KR Publication 2008-0064778, Jul. 2008.*
(Continued)

*Primary Examiner* — Brittany L Raymond
(74) *Attorney, Agent, or Firm* — JCIPRNET

(57) ABSTRACT

Polysilsesquioxane covering silicon nanoparticles, or a calcined product thereof, comprising silicon nanoparticles, which have a volume-basis mean particle size of 10-500 nm, exclusive, and do not include particles having a particle size
(Continued)

of 1000 nm or larger, and polysilsesquioxane, which covers the silicon nanoparticles and is chemically bonded to the surfaces of the silicon nanoparticles, said polysilsesquioxane covering silicon nanoparticles or the calcined product thereof having Si—H bonds. When observed using a transmission electron microscope (TEM), the thickness of the polysilsesquioxane is 1-30 nm, inclusive.

10 Claims, 2 Drawing Sheets

(51) Int. Cl.
    *H01M 4/60*     (2006.01)
    *H01M 10/0525*     (2010.01)
    *C01B 33/02*     (2006.01)
    *H01M 4/02*     (2006.01)

(52) U.S. Cl.
    CPC ..... *H01M 10/0525* (2013.01); *C01P 2002/82* (2013.01); *C01P 2004/03* (2013.01); *C01P 2004/04* (2013.01); *C01P 2004/62* (2013.01); *C01P 2004/64* (2013.01); *C01P 2004/80* (2013.01); *C01P 2006/40* (2013.01); *H01M 2004/021* (2013.01); *H01M 2004/027* (2013.01)

(58) Field of Classification Search
    CPC ........ H01M 2004/027; H01M 10/0525; C01B 33/02; C01B 33/113; C01P 2002/82; C01P 2004/03; C01P 2004/04; C01P 2004/62; C01P 2004/64; C01P 2004/80; C01P 2006/40; Y02E 60/10
    See application file for complete search history.

(56) References Cited

FOREIGN PATENT DOCUMENTS

| | | | |
|---|---|---|---|
| JP | 2008171813 | | 7/2008 |
| JP | 2016514898 | | 5/2016 |
| KR | 10-2008-0064778 | | 7/2008 |
| KR | 2008-0064778 | * | 7/2008 |
| WO | 2016208314 | | 12/2016 |
| WO | 2018003150 | | 1/2018 |

OTHER PUBLICATIONS

"International Search Report (Form PCT/ISA/210) of PCT/JP2018/000348", with English translation thereof, dated Jun. 12, 2018, pp. 1-3.

* cited by examiner

_US 11,031,591 B2_

POLYSILSESQUIOXANE COVERED SILICON NANOPARTICLES OR CALCINED PRODUCT THEREOF AND PRODUCTION METHOD THEREOF, NEGATIVE ELECTRODE ACTIVE MATERIAL FOR LITHIUM ION BATTERY, NEGATIVE ELECTRODE FOR LITHIUM ION BATTERY AND LITHIUM ION BATTERY

CROSS-REFERENCE TO RELATED APPLICATION

This application is a 371 application of the international PCT application serial no. PCT/JP2018/000348, filed on Jan. 10, 2018, which claims the priority benefit of Japan application no. 2017-002955, filed on Jan. 11, 2017. The entirety of each of the abovementioned patent applications is hereby incorporated by reference herein and made a part of this specification.

TECHNICAL FIELD

This invention relates to a polysilsesquioxane covering silicon nanoparticle calcined product having the chemical bonds between the surface of silicon nanoparticles and a hydrogen polysilsesquioxane and a negative electrode active material for a lithium ion battery containing polysilsesquioxane covering silicon nanoparticle calcined product, a negative electrode for a lithium ion battery containing the negative electrode active material, and a lithium ion battery comprising the negative electrode for the lithium ion battery.

BACKGROUND ART

Various portable devices have been recently widely used in association with rapid evolution of electronic devices, communication devices and the like and development of the size reduction technologies. Then, as a power supply of the above portable devices, from the viewpoints of economic efficiency, size reduction and weight reduction of the device, development of the secondary battery having high capacity and excellent service-life properties are strongly desired.

As a small-sized, lightweight and high capacity secondary battery described above, development currently progresses on a rocking chair type lithium ion battery in which a lithium intercalation compound that releases a lithium ion from an interlayer is used as a positive electrode material and a carbonaceous material represented by graphite and the like that can intercalate or deintercalate the lithium ion into or from the interlayer between crystal planes during the charge-discharge is used as a negative electrode material, and the lithium ion battery has been brought into practical use and generally used.

A nonaqueous electrolyte secondary battery in which a lithium compound is used as a negative electrode has high voltage and high energy density, and among them, a lithium metal has been targeted by many researches as a negative electrode active material in an early stage because of high battery capacity. However, when the lithium metal is used as the negative electrode, a large amount of dendritic lithium precipitates on the surface of negative electrode lithium during charge, and therefore the charge-discharge efficiency is reduced, or the dendritic lithium grows to cause short circuiting with a positive electrode in several cases. In addition, the lithium metal itself is unstable, and has high reactivity, and is sensitive to heat and shock, and therefore problems have remained in commercialization of the negative electrode using the lithium metal.

Then, as a negative electrode active material in place of the lithium metal, a carbon-based negative electrode that intercalates or deintercalates lithium has come to be used (Patent Literature 1).

The carbon-based negative electrode had solved the various problems of the lithium metal, and greatly contributed to the spreading of lithium ion battery. However, as mobile apparatus for various carrying was gradually downsized, lightweighted, and highly advanced, high quantification of the lithium ion battery appeared as an important problem.

The lithium ion battery using the carbon-based negative electrode essentially has low battery capacity due to the porous structure of carbon. For example, even in the case of the graphite having the highest crystallinity as a carbon, the theoretical capacity is 372 mAh/g in the composition of $LiC_6$. In comparison, this value is only approximately 10% of the theoretical capacity of the lithium metal of 3860 mAh/g. From the situations, regardless of the above problems, the studies for increasing the capacity of the battery by introducing metals such as the lithium into a negative electrode is actively attempted again.

As a representative, using a material mainly containing a metal that can be alloyed with the lithium (Si, Sn and Al) as the negative electrode active material is studied. However, the material that can be alloyed with the lithium, such as Si and Sn, may expand the volume during the alloying reaction with the lithium to produce the fine powder of the metal material particles so as to reduce the contact between the metal material particles. Thereby, an active area material is produced which is electrically isolated therefrom within the electrode in some cases. Further, the material has the problems of causing desorption of the metal material particles from the electrode to increase internal resistance and reduce the capacity, resulting in reducing cycle performance, or increasing severity of electrolyte decomposition reaction by increasing the specific surface area, or the like.

In order to solve the problems of such metal material, the studies on using a metal oxide having a relatively lower coefficient of volume expansion than the metal as a material of the negative electrode active material.

For example, Patent Literature 2 discloses that good charge-discharge cycle properties are obtained when a silicon oxide containing silicon and oxygen and having the ratio of oxygen to silicon of 0 to 2 is used as a negative electrode active material of a lithium ion battery.

Patent Literature 3 proposes using a hydrogen polysilsesquioxane calcined product as a silicon oxide negative electrode active material containing the amorphous silicon oxide having nanoporous structure.

Patent Literature 4 proposes a silicon oxide which makes up for the disadvantage of volume expansion during the charge-discharge for the disadvantage of volume expansion at the time of the charge-discharge and is capable of easily controlling the ratio of silicon to oxygen by forming the structures in which a core containing silicon and silicon nanoparticles formed on the surface of the core are arranged.

All the silicon oxide compounds mentioned in the above literatures are the compounds having no hydrogen is not contained, but the presence of Si—H bonds is not mentioned. Therefore, the silicon oxide compounds mentioned in the above patent literatures are compounds which are essentially different from the polysilsesquioxane covering silicon nanoparticle of the present invention and the calcined product thereof. The above patent literatures do not suggest the presence of the chemical bond between the silicon nanoparticles and the silicon oxide. Consequently, the structures described in the above patent literatures can be determined to be also different from a polysilsesquioxane covering silicon nanoparticle calcined product of the present invention. When the silicon oxide compounds described above are used as a battery negative electrode active material, battery properties can be improved to a certain level, but, one or more of discharge capacity, initial charge-discharge efficiency and capacity maintenance rate of the charge-discharge cycles cannot achieve the level which does not cause any problems. The technique could not provide any negative electrode active materials which provide balanced battery properties and cannot be subjected to highly practical use.

CITATION LIST

Patent Literature

Patent Literature 1: JP S62-90863 A
Patent Literature 2: JP 2004-71542 A
Patent Literature 3: JP 2008-171813 A
Patent Literature 4: JP 2016-514898 A

SUMMARY OF INVENTION

Technical Problem

For the negative electrode active material, the problems of conventional negative electrode materials are required to be solved, and the developing of the negative electrode active material providing the resulting battery having excellent cycle properties, good initial charge-discharge efficiency and high charge capacity.

The present invention provides a new silicon oxide structure as a negative electrode active material for the secondary battery providing a resulting battery having excellent cycle properties, good initial charge-discharge efficiency and high charge capacity.

Solution to Problem

The present inventors have diligently continued to conduct the study toward solving the problems, and as a result, the present inventors have found that a polysilsesquioxane covering silicon nanoparticle calcined product providing a resulting secondary battery having excellent cycle properties, good initial charge-discharge efficiency and high charge capacity, when the polysilsesquioxane covering silicon nanoparticle calcined product can used as a negative electrode active material for a lithium ion battery. As a result, the present invention has been achieved.

More specifically, the present invention includes the aspects described below.
[1] A polysilsesquioxane covering silicon nanoparticle comprising
a silicon nanoparticle having a volume-basis mean particle size of more than 10 nm and less than 500 nm and having no particle having a particle size of 1000 nm or more, and
a polysilsesquioxane covering the silicon nanoparticle and being chemically bonded to a surface of the silicon nanoparticle,
wherein the polysilsesquioxane covering silicon nanoparticle has a Si—H bond, and
wherein a thickness of the polysilsesquioxane observed with a transmission electron microscope (TEM) is 1 nm or more and 30 nm or less; or a calcined product of the polysilsesquioxane covering silicon nanoparticle.
[2] The polysilsesquioxane covering silicon nanoparticle or the calcined product thereof according to [1], wherein within an absorption band of 1000 to 1250 cm$^{-1}$ derived from a Si—O—Si bond when an intensity of a maximum absorption peak in a wavelength of 1100 cm$^{-1}$ or higher is $I_{2\text{-}1}$, and an intensity of a maximum absorption peak in a wavelength of 1100 cm$^{-1}$ or lower is $I_{2\text{-}2}$ in a spectrum obtained by measuring the polysilsesquioxane covering silicon nanoparticle by an infrared spectroscopy, an intensity ratio $(I_{2\text{-}1}/I_{2\text{-}2})$ is greater than 1.
[3] The calcined product of the polysilsesquioxane covering silicon nanoparticle according to [1] or [2], wherein when an intensity of a maximum absorption peak within an absorption band of 820 to 920 cm$^{-1}$ derived from a Si—H bond is $I_1$ and an intensity of a maximum absorption peak within an absorption band in 1000 to 1250 cm$^{-1}$ derived from a Si—O—Si bond is $I_2$ in an spectrum obtained by measuring the polysilsesquioxane covering silicon nanoparticle by an infrared spectroscopy, an intensity ratio $(I_1/I_2)$ is in a range of from 0.01 to 0.35.
[4] A negative electrode active material for a lithium ion battery comprising the calcined product of the polysilsesquioxane covering silicon nanoparticle according to any one of [1] to [3].
[5] A negative electrode for a lithium ion battery comprising the negative electrode active material for a lithium ion battery according to [4].
[6] A lithium ion battery comprising the negative electrode for a lithium ion battery according to [5].
[7] A method for producing a polysilsesquioxane covering silicon nanoparticle or a calcined product of the polysilsesquioxane covering silicon nanoparticle,
wherein the polysilsesquioxane covering silicon nanoparticle has a silicon nanoparticle having a volume-basis mean particle size of more than 10 nm and less than 500 nm and has no particle having a particle size of 1000 nm or more and
a polysilsesquioxane covering the silicon nanoparticle and being chemically bonded to a surface of the silicon nanoparticle,
wherein the polysilsesquioxane covering silicon nanoparticle has a Si—H bond, and
wherein a thickness of the polysilsesquioxane observed with a transmission electron microscope (TEM) is 1 nm or more and 30 nm or less;
the method comprising:
hydrolyzing and condensation reacting a silicon compound represented by a formula (1) in the presence of the silicon nanoparticle:

wherein R is a group selected from the group consisting of a halogen atom, a hydrogen atom, a substituted or unsubstituted alkoxy group having 1 to 10 carbons, a substituted or unsubstituted aryloxy group having 6 to 20 carbons and a substituted or unsubstituted arylalkoxy group having 7 to 30 carbons, R may be identical to or different from each other, provided that in the substituted or unsubstituted alkoxy group having 1 to 10 carbons, the substituted or unsubstituted aryloxy group having 6 to 20 carbons and the substituted or unsubstituted arylalkoxy group having 7 to 30 carbons, a hydrogen atom may be optionally replaced by a halogen atom.
[8] The method for producing the calcined product of the polysilsesquioxane covering silicon nanoparticle according to [7], further comprising conducting calcination under an non-oxidizing atmosphere, after the hydrolyzation and condensation reaction.

Advantageous Effects of Invention

A lithium ion battery using a negative electrode active material containing the polysilsesquioxane covering silicon nanoparticle calcined product of the present invention has the specific structure of the present invention, which has excellent cycle properties, good initial charge-discharge efficiency and high charge capacity.

DESCRIPTION OF EMBODIMENT

Figure 1:
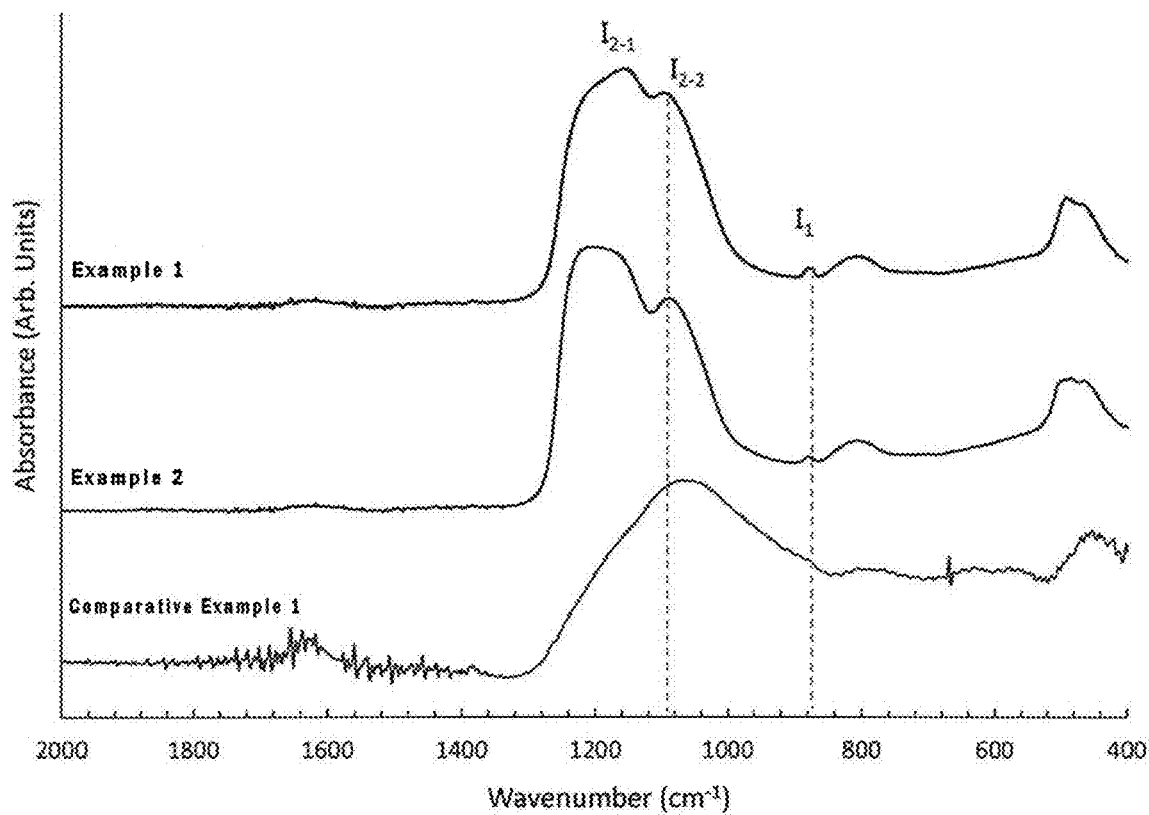
FIG. 1 is a chart of IR absorption spectra of the polysilsesquioxane covering silicon nanoparticle calcined product (1) obtained in Example 1, the polysilsesquioxane covering silicon nanoparticle calcined product (2) obtained in Example 2, the silicon nanoparticle mix silicon oxide (1) obtained in Comparative Example 1, which were measured by the infrared spectroscopy (IR).

Hereinafter, the present invention will be described in more detail.

A polysilsesquioxane covering silicon nanoparticle calcined product of the present invention can be obtained by conducting heat treatment to a polysilsesquioxane covering silicon nanoparticle (a precursor of the polysilsesquioxane covering silicon nanoparticle calcined product). Therefore, the explanations are described in order from the polysilsesquioxane covering silicon nanoparticle to the polysilsesquioxane covering silicon nanoparticle calcined product.

<Production of Polysilsesquioxane Covering Silicon Nanoparticle>

The polysilsesquioxane covering silicon nanoparticle can be obtained by adding silicon nanoparticles during the hydrolysis reaction and a condensation reaction of a silicon compound represented by formula (1) for synthesis of a hydrogen silsesquioxane polymer (HPSQ), but the production method is not particularly limited thereto. Specific examples include a method of conducting the hydrolysis reaction and the condensation reaction of a mixture obtained by adding silicon nanopowder to the silicon compound represented by formula (1), and a method of adding dropwise a silicon compound represented by formula (1) into a solvent in which the silicon nanopowder is dispersed and conducting the hydrolysis reaction and the condensation reaction.

In formula (1), R is a halogen atom, a hydrogen atom or a group selected from substituted or unsubstituted alkoxy group having 1 to 10 carbons, substituted or unsubstituted aryloxy group having 6 to 20 carbons and substituted or unsubstituted arylalkoxy group having 7 to 30 carbons, R may be identical to or different from each other, provided that in substituted or unsubstituted alkoxy group having 1 to 10 carbons, substituted or unsubstituted aryloxy group having 6 to 20 carbons and substituted or unsubstituted arylalkoxy group having 7 to 30 carbons, an hydrogen atom may be optionally replaced with a halogen atom.

The silicon compound represented by a formula (1) includes the following compounds described below.

Examples include trihalogenated silane or dihalogenated silane such as trichlorosilane, trifluorosilane, tribromosilane and dichlorosilane; trialkoxysilane and dialkoxysilane such as tri-n-butoxysilane, tri-t-butoxysilane, tri-n-propoxysilane, tri-i-propoxysilane, di-n-butoxyethoxysilane, triethoxysilane, trimethoxysilane and diethoxysilane; and aryloxysilane and aryloxyalkoxysilane such as triaryloxysilane, diaryloxysilane and diaryloxyethoxysilane.

Among the above compounds, from the viewpoints of reactivity, ease of availability and production cost, trihalogenated silane or trialkoxysilane are preferred, and trihalogenated silane is particularly preferred.

The silicon compounds represented by formula (1) may be used alone, or two or more kinds of the silicon compounds may be mixed and used.

The silicon compound represented by formula (1) has the high hydrolyzability and the condensation reactivity, and therefore, by using the silicon compound, the polysilsesquioxane covering silicon nanoparticle can be easily obtained. In addition, by using of the silicon compound represented by formula (1), the polysilsesquioxane covering silicon nanoparticle also has an advantage that the polysilsesquioxane covering silicon nanoparticle calcined product obtained by heat treatment under the non-oxidizing atmosphere can appropriately provide the Si—H bond.

Next, the hydrolysis reaction and the polycondensation reaction of the mixture obtained by adding the silicon nanoparticles to the silicon compound represented by formula (1) will be described.

The hydrolysis reaction can be performed by a conventional method, for example, the hydrolysis reaction can be performed in a solvent such as an alcohol or DMF in the presence of an inorganic acid such as hydrochloric acid or an organic acid such as acetic acid and water at the ordinary temperature or under heating. Accordingly, the reaction mixture after the hydrolysis reaction may contain a solvent, an acid, water, and a material derived therefrom in addition to the hydrolysate of the silicon compound represented by formula (1).

In the reaction mixture after the hydrolysis reaction, the silicon compound represented by formula (1) is not necessary to be completely hydrolyzed, and the part of the silicon compound may remain.

In addition, the polycondensation reaction of the hydrolysate also partially progresses in addition to the hydrolysis reaction.

A progress degree of the polycondensation reaction can be controlled by hydrolysis temperature, hydrolysis time, acidity and/or solvent or the like, and for example, can be appropriately set according to the object polysilsesquioxane covering silicon nanoparticle.

In consideration of the productivity and the production cost thereof, a method in which the hydrolysis reaction and the condensation reaction are concurrently carried out under identical conditions in one reactor is preferred.

As reaction conditions, the silicon compound represented by formula (1) is added to an acidic aqueous solution under stirring, and is allowed to react at a temperature of −20 to 50° C., preferably 0 to 40° C., and particularly preferably 10 to 30° C., for 0.5 to 20 hours, preferably for 1 to 10 hours, and particularly preferably for 1 to 5 hours.

The acidity of the hydrolysis solution is preferably adjusted ordinarily to pH 7 or less, and more preferably to pH 6 or less, and further preferably pH 3 or less. As the acid used for pH adjustment, any of the organic acid and the inorganic acid can be used.

Specific examples of the organic acid include formic acid, acetic acid, propionic acid, oxalic acid and citric acid, and specific examples of the inorganic acid include hydrochloric acid, sulfuric acid, nitric acid and phosphoric acid. Among the above acids, hydrochloric acid and acetic acid are preferred in view of easily controlling the hydrolysis reaction and the subsequent polycondensation reaction, the ease of availability, the pH adjustment and the treatment after the reaction.

When halogenated silane such as trichlorosilane is used as a silicon compound represented by formula (1), the acidic aqueous solution is formed in the presence of water, and therefore an acid is not necessary to be added separately, which is one of preferred aspects of the present invention.

The polysilsesquioxane covering silicon nanoparticle which is a precursor of the polysilsesquioxane covering silicon nanoparticle calcined product can be obtained by conducting the hydrolysis reaction and the condensation reaction of the compound represented by formula (1) in the coexistence of the silicon nanoparticles. The silicon nanoparticles to be used are not particularly limited as long as a volume-basis mean particle size thereof is more than 10 nm and less than 500 nm. As for the lower limit of volume-basis mean particle size, more than 20 nm is preferable, and more than 30 nm is further preferable. As for the upper limit of volume-basis mean particle size, less than 400 nm is preferable, and less than 300 nm is further preferable. The silicon nanopowder or the like is preferably used as silicon nanoparticles. The durability of the resultant negative electrode (cycle properties) tends to easily deteriorate while the initial electric discharge efficiency is higher, when a large quantity of silicon nanoparticles is used. However, the use of the microparticulated silicon nanoparticles can suppress the deterioration in durability. Therefore, the silicon nanoparticles which do not include any particle having a particle size of 1,000 nm or more is preferable to use.

The silicon nanoparticles may contain another component other than silicon for example carbons and metals, etc., within the range that the advantageous effects of the present invention are not adversely affected. The contents thereof are ordinarily less than 5% by weight to the silicon nanoparticles.

The volume-basis mean particle size herein means a particle size calculated in the volume basis, and may be occasionally referred to simply as a mean particle size.

The silicon nanoparticles are added so that the thickness of the coating can be 1 nm or more and 30 nm or less with respect to the total amount of the polysilsesquioxane covering silicon nanoparticle to be obtained. The proportion of the silicon nanoparticle in the total weight of polysilsesquioxane covering silicon nanoparticle is approximately 25 to 95% by weight, but is not limited to the above-mentioned proportion because the covering thickness varies depending on the particle size.

After the completion of the hydrolysis reaction and the polycondensation reaction, a liquid portion is separated and removed by a conventional method such as filtration separation, centrifugal separation or decantation. In some cases, the resulting material is further washed with water or an organic solvent, and then dried, and thus polysilsesquioxane covering silicon nanoparticle can be obtained.

<Structure of Polysilsesquioxane Covering Silicon Nanoparticle>

The polysilsesquioxane covering silicon nanoparticle has features that an intensity ratio ($I_{2-1}/I_{2-2}$) is greater than 1, within absorption bands at 1000 to 1250 cm$^{-1}$ which derived from Si—O—Si bond, when an intensity of a maximum absorption peak (peak 2-1) in a wavelength of 1100 cm$^{-1}$ or higher is $I_{2-1}$ and an intensity of a maximum absorption peak (peak 2-2) in a wavelength of 1100 cm$^{-1}$ or lower is $I_{2-2}$ in the spectrum obtained by measurement with the infrared spectroscopy. The peak intensity ratio of greater than 1 indicates that the polysilsesquioxane covering silicon nanoparticle has a chemical bond between the silicon nanoparticles existing therein and the hydrogen polysilsesquioxane, and the particle disintegration caused by the expansion and contraction of the silicon nanoparticles during the charge-discharge cycle is expected to be suppressed by the presence of the chemical bond.

An absorption band in 1000 to 1250 cm$^{-1}$ in an IR spectrum of the hydrogen polysilsesquioxane is derived from the asymmetric stretching vibration of the Si—O—Si bond. In the case of a straight-chain bond, multiple peaks of absorption are generally observed in 1000 to 1250 cm$^{-1}$, and in the case of a cyclic bond, one peak of absorption is generally observed in 1000 to 1100 cm$^{-1}$. In the IR spectrum of the polysilsesquioxane covering silicon nanoparticle, within absorption bands at 1000 to 1250 cm$^{-1}$, a maximum absorption peak (peak 2-1) in a wavelength of 1100 cm$^{-1}$ or higher is attributed to be derived from the straight-chain bond of siloxane, within absorption bands in 1000 to 1250 cm$^{-1}$, a maximum absorption peak (peak 2-2) in a wavelength of 1100 cm$^{-1}$ or lower is attributed to be derived from both the straight-chain bond and the cyclic bond of siloxane. When the silicon compound represented by formula (1) is subjected to the hydrolysis reaction and the condensation reaction alone without the coexistence of the silicon nanoparticles, the energy of a system is expected to be further reduced by the reaction of the polymer terminals with each other to form a cyclic siloxane rather than the reaction of the polymer terminal with a monomer to form a straight-chain siloxane. Accordingly, the results that peak 2-2 is larger than peak 2-1 can be easily predicted.

When the hydrolysis-polymerization of the silicon compound represented by formula (1) progresses in the coexistence of the silicon nanoparticles, and if a terminal portion of a chain Si—O—Si structure included in the HPSQ polymer to be formed reacts with the silanol structure on a surface of the silicon nanoparticles, the polymerization is terminated at the terminal portion, and the chain Si—O—Si structure is kept. As a result, the formation of the cyclic Si—O—Si structure is conceivably suppressed in comparison with the case of the reaction of the silicon compound represented by formula (1) alone. Further, with regard to the above ratio, the ratio of the cyclic Si—O—Si structure is almost maintained even after heat treatment. Therefore, the state of $I_{2-1}/I_{2-2}>1$ is also maintained even after the calcination.

Thus, in the polysilsesquioxane covering silicon nanoparticle, the silicon nanoparticles and the polysilsesquioxane form a network through the strong chemical bond (Si—O—Si bond). The network is maintained even after the calcination, and the polysilsesquioxane structure plays a role of a buffer layer against the expansion and contraction of the silicon nanoparticles, and as a result, the pulverization of the silicon nanoparticles caused during repetition of the charge-discharge is expected to be suppressed.

Because the primary particles are small, when the calcined product of the polysilsesquioxane covering silicon nanoparticle is used as a negative electrode material for the lithium ion battery, the stress during the expansion and contraction caused during repetition of the charge-discharge is relaxed. Accordingly, the cycle deterioration is suppressed to be effective in improving cycle properties. Moreover, the polysilsesquioxane covering silicon nanoparticle has a complicated secondary aggregation structure, resulting in favorable binding properties with the binder to develop further excellent cycle properties.

Next, the polysilsesquioxane covering silicon nanoparticle calcined product obtained by calcining the polysilsesquioxane covering silicon nanoparticle will be described.

<Production of Polysilsesquioxane Covering Silicon Nanoparticle Calcined Product>

The polysilsesquioxane covering silicon nanoparticle calcined product is obtained by heat-treatment to the polysilsesquioxane covering silicon nanoparticle obtained under the non-oxidizing atmosphere by the method described above. The term "non-oxidizing" herein literally means that the polysilsesquioxane covering silicon nanoparticle is not oxidized, but substantially "non-oxidizing" involves the state that the formation of silicon dioxide is suppressed to a degree at which the advantageous effects of the present invention are not adversely affected upon heat treatment (More specifically, a value of $I_1/I_2$ may be adjusted within a numerical range specified in the present invention). Accordingly, with regard to a state of "non-oxidizing" means that oxygen is removed so that the object can be achieved. In the specification, $I_1$ means an intensity of a maximum absorption peak (peak 1) within an absorption band of 820 to 920 $cm^{-1}$ derived from the Si—H bond. The polysilsesquioxane covering silicon nanoparticle calcined product thus obtained contains a silicon atom (Si), an oxygen atom (O) and a hydrogen atom (H), and is represented by the general formula $SiO_xH_y$.

In addition, as for the polysilsesquioxane covering silicon nanoparticle calcined product, in the spectrum measured by the infrared spectroscopy, when the intensity of the maximum absorption peak (peak 1) in the absorption band of 820 to 920 $cm^{-1}$ derived from the Si—H bond is $I_1$, and the intensity of the maximum absorption peak (peak 2) in the absorption band of 1000 to 1250 $cm^{-1}$ derived from the Si—O—Si bond is $I_2$, the intensity ratio ($I_1/I_2$) is preferably in the range of 0.01 to 0.35.

The ratio ($I_1/I_2$) of the intensity of peak 1 ($I_1$) and the intensity of peak 2 ($I_2$) is preferably in the range of 0.01 to 0.35, more preferably in the range of 0.01 to 0.30, and further preferably in the range of 0.03 to 0.20, by the presence of a suitable amount of the Si—H bond, high discharge capacity, excellent initial charge-discharge efficiency and excellent cycle properties can be provided when the calcined product is used as a negative electrode active material for a lithium ion battery.

As for the polysilsesquioxane covering silicon nanoparticle calcined product, in the spectrum measured by the infrared spectroscopy, within absorption bands of 1000 to 1250 $cm^{-1}$ derived from Si—O—Si bond, when an intensity of a maximum absorption peak (peak 2-1) in a wavelength of 1100 $cm^{-1}$ or higher is $I_{2\text{-}1}$ and an intensity of a maximum absorption peak (peak 2-2) in a wavelength of 1100 $cm^{-1}$ or lower is $I_{2\text{-}2}$, the intensity ratio ($I_{2\text{-}1}/I_{2\text{-}2}$) of the polysilsesquioxane covering silicon nanoparticle calcined product is preferably greater than 1. The peak intensity ratio of greater than 1 indicates that the polysilsesquioxane covering silicon nanoparticle calcined product has a chemical bond between the silicon nanoparticles existing therein and the hydrogen polysilsesquioxane, and a particle disintegration caused by the expansion and contraction of the silicon nanoparticles during the charge-discharge cycle is expected to be suppressed by the presence of the chemical bond.

As described above, heat treatment to the polysilsesquioxane covering silicon nanoparticle is preferably carried out under the non-oxidizing atmosphere. If heat treatment is carried out in the atmosphere containing oxygen, a silicon dioxide is formed, thereby being unable to obtain a desired composition and a desired Si—H bonding amount.

The non-oxidizing atmosphere includes inert gas atmosphere, atmosphere in which oxygen is removed by high vacuum (the atmosphere only needs that oxygen is removed to a degree not suppressing the formation of the objective polysilsesquioxane covering silicon nanoparticle calcined product), the reduced atmosphere and the atmosphere combination of the above atmospheres. Specific examples of inert gas include nitrogen, argon and helium. The above inert gas can be used without any problems, if inert gas having a high purity grade is generally used. Moreover, the atmosphere in which oxygen is removed by high vacuum without using inert gas may be applied. The reduced atmosphere involves the atmosphere containing reduced gas such as hydrogen. Specific examples include a mixed gas atmosphere of 2% by volume or more of hydrogen gas and inert gas. In addition, as reduced gas, a hydrogen gas atmosphere can also be used.

The polysilsesquioxane covering silicon nanoparticle is heat-treated under the non-oxidizing atmosphere, thereby causing start of dehydrogenation of the Si—H bond from about 600° C. to form a Si—Si bond. If the Si—Si bond is moderately grown, the Si—Si bond is formed into excellent Li insertion site to serve as a source of a high charge capacity. Meanwhile, the Si—H bond interacts with a binder having a functional group such as a $COO^-$ group, being a conventional battery material component, to form a flexible and strong bond, and therefore when the battery is formed, the good cycle properties are developed.

Accordingly, a suitable amount of the Si—H bond is required to remain in order to develop both high capacity and good cycle properties. Heat treatment temperature satisfying such conditions is ordinarily 600 to 1000° C., and preferably 750 to 900° C. If the temperature is less than 600° C., the discharge capacity is not enough. If the temperature is more than 1000° C., the Si—H bonds disappear, and therefore good cycle properties are unable to be obtained.

Heat treatment time is not particularly limited, but is ordinarily 15 minutes to 10 hours, and preferably 30 minutes to 5 hours.

The polysilsesquioxane covering silicon nanoparticle calcined product in which the thickness of the covering is 1 nm or more and 30 nm or less is obtained by heat treatment described above. If the thickness of the covering is 1 nm or more, the battery deterioration can be suppressed. If the thickness of the covering is 30 nm or less, the battery having high capacity and initial charge-discharge efficiency can be obtained.

Figure 2:
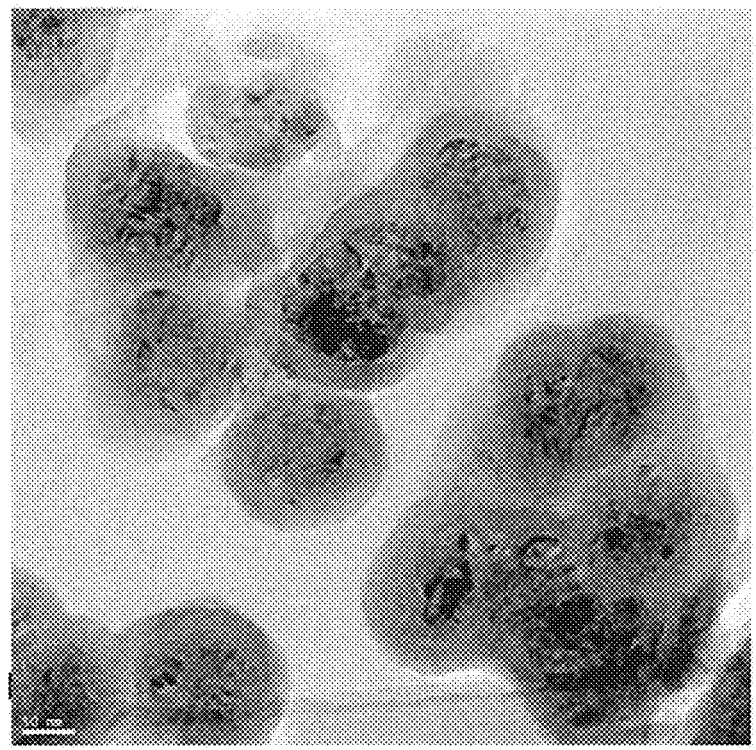
FIG. 2 shows a photograph of a transmission electron microscope (TEM) of a polysilsesquioxane covering silicon nanoparticle calcined product (1) obtained in Example 1.

The thus obtained polysilsesquioxane covering silicon nanoparticle calcined product of the present invention, as is clear from the photograph of a transmission electron microscope (TEM) in FIG. 2, the surface of the silicon nanoparticles is covered with a polysilsesquioxane layer with a thickness of 1 nm or more and 30 nm or less. Thus, as is clear from the scanning microscope photograph of in FIG. 3, the shape thereof is formed of a secondary aggregate having micron order formed by further aggregating primary particles being spherical particles having a particle size of submicron order.

Because the primary particles are small, when the polysilsesquioxane covering silicon nanoparticle is used as a negative electrode material for a lithium ion battery, stress during the expansion and contraction caused during repetition of the charge-discharge is relaxed. Accordingly, the cycle deterioration is suppressed to be effective in improving cycle properties. Moreover, the silicon nanoparticle-containing hydrogen polysilsesquioxane has a complicated secondary aggregation structure, resulting in favorable binding properties with a binder to develop further excellent cycle properties.

<Negative Electrode Active Material Including Polysilsesquioxane Covering Silicon Nanoparticle-Calcined Product>

Next, the negative electrode active material including the polysilsesquioxane covering silicon nanoparticle calcined product will be described.

For achieving a battery having high capacity, a large amount of current is essential to be charged and discharged, and therefore a material having low electric resistance is demanded in an electrode.

Accordingly, complexing or covering a carbon-based material with the polysilsesquioxane covering silicon nanoparticle calcined product is also an aspect of the present invention.

In order to complex or cover the calcined product with the carbon-based material, a method of dispersing the carbon-based material in the polysilsesquioxane covering silicon nanoparticle calcined product by a mechanical mixing method using mechanofusion or a ball mill and a vibrating mill or the like.

Specific examples of the carbon-based material preferably include a carbon-based material such as graphite, carbon black, fullerene, carbon nanotube, carbon nanofoam, pitch carbon fibers, polyacrylonitrile carbon fiber and amorphous carbon.

The polysilsesquioxane covering silicon nanoparticle calcined product and the carbon-based material can be complexed or covered at an arbitrary proportion.

<Negative Electrode>

The negative electrode in a lithium ion secondary battery of the present invention is produced by using the negative electrode active material containing the polysilsesquioxane covering silicon nanoparticle calcined product or the polysilsesquioxane covering silicon nanoparticle calcined product which is complexed or covered with the carbon-based material.

As a negative electrode, for example, and a negative electrode mixture including the negative electrode active material containing the polysilsesquioxane covering silicon nanoparticle calcined product or polysilsesquioxane covering silicon nanoparticle calcined product which is complexed or covered with the carbon-based material and the binder, shaped into a predetermined form can be used. The negative electrode may be produced by a method of applying the negative electrode mixture to a current collector such as a copper foil. A method for forming a negative electrode is not particularly limited, and a conventional method can be used.

More specifically, for example, a negative electrode plate is obtained by a method of preparing a negative electrode material composition containing the negative electrode active material containing the polysilsesquioxane covering silicon nanoparticle calcined product, or the silicon nanoparticle-containing polysilsesquioxane covering silicon nanoparticle calcined product complexed with the carbon-based material, the binder, and optionally a conductive material etc. and then directly coating the current collector with the resulting material in a rod-shaped body, a plate-shaped body, a foil-shaped body, a net-shaped body etc. mainly containing copper, nickel, stainless steel etc., or separately casting the negative electrode material composition on a support and laminating a negative electrode active material film exfoliated from the support on the current collector and laminating on a current collector. Moreover, the negative electrode of the present invention is not limited to the forms described above, and can also be obtained in a form other than the forms described above.

As a binder, any binder can be used in the present invention as long as the binder can be generally used in a secondary battery and has a functional group such as the $COO^-$ group having interaction with the Si—H bond on the negative electrode active material. Specific examples thereof include carboxymethylcellulose, polyacrylic acid, alginic acid, glucomannan, amylose, saccharose, derivative or polymer thereof, alkali metal salt thereof, and polyimide resin and polyimideamide resin. The binder may be used alone, or in the form of a mixture thereof. Furthermore, a component providing another function, for example, improvement in binding properties with a current collector, improvement in dispersibility and improvement in conductivity of the binder itself, for example, a styrene-butadiene rubber-based polymer or a styrene-isoprene rubber-based polymer, which may be added and mixed.

<Lithium Ion Battery>

A lithium ion battery using the negative electrode active material formed by containing the polysilsesquioxane covering silicon nanoparticle calcined product of the present invention can be produced as follows.

First, a positive electrode active material that can reversibly insert and remove a lithium ion, a conductive aid, a binder and a solvent are mixed to prepare a positive electrode active material composition. In the manner similar to the negative electrode, according to a publicly known method, the positive electrode active material composition is directly coated on a metal current collector and dried to produce a positive plate.

A positive electrode can also be produced by separately casting the positive electrode active material composition on the support, and then laminating the film exfoliated from the support on the metal current collector. A method for shaping the positive electrode is not particularly limited, and a conventional method can be used.

The positive electrode active material is not particularly limited as long as the material is a lithium metal complex oxide, and is generally used in a field of the secondary battery. Specific examples include lithium cobalt oxide, lithium nickel oxide, lithium manganese oxide having a spinel structure, a lithium cobalt manganese oxide, an iron phosphate having an olivine structure, so-called a ternary lithium metal complex oxide and a nickel lithium metal complex oxide. Moreover, $V_2O_5$, TiS, MoS and the like which are compounds allowing desorption and insertion of the lithium ion, can also be used.

A conductive aid is not particularly limited and any conductive aid may be used, as long as the aid is an electron conductive material generally used in a lithium ion battery and does not decompose or deteriorate in the configured battery. Specific examples include carbon black such as acetylene black, graphite fine particles, vapor phase epitaxial carbon fibers and a combination of two or more thereof.

Moreover, specific examples of the binder include vinylidene fluoride-hexafluoropropylene copolymer, polyvinylidene fluoride (PVDF), polyacrylonitrile, polymethylmethacrylate, polytetrafluoroethylene and mixture thereof, and styrene-butadiene rubber polymer, but the binder is not limited thereto. In addition, specific examples of the solvent include N-methyl pyrrolidone, acetone and water, but the solvent is not limited thereto.

The contents of the positive electrode active material, the conductive aid, the binder and the solvent are amounts which can be generally used in the lithium ion battery.

A separator interposed between the positive electrode and the negative electrode is not particularly limited, as long as the separator is generally used in the lithium ion battery. The separator having low resistance to ion transfer of an electrolyte, or excellent electrolyte impregnation ability is preferred. Specific examples include a material selected from glass fibers, polyester, polyethylene, polypropylene, polytetrafluoroethylene, polyimide or compounds thereof, and the material may be in the form of a nonwoven fabric or a woven fabric.

More specifically, in the case of a lithium ion battery, using a windable separator made of a material such as polyethylene or polypropylene is preferred, and in the case of a lithium ion polymer battery, using a separator excellent in organic electrolyte impregnation ability is preferred.

As the electrolyte, one or a mixture of two or more of electrolytes including lithium salt such as lithium hexafluorophosphate, lithium tetrafluoroborate, lithium hexaantimony, lithium hexafluoroarsenate, lithium perchlorate, lithium trifluoromethanesulfonate, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein, x and y are a natural number), LiCl and LiI dissolved in a solvent such as propylene carbonate, ethylene carbonate, dimethyl carbonate, diethyl carbonate, ethyl methyl carbonate, methyl propyl carbonate, butylene carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether or a mix solvent thereof can be used.

Moreover, various nonaqueous electrolytes other than the above or solid electrolytes can also be used. For example, various ionic liquids to which a lithium ion is added, a pseudo solid electrolyte in which the ionic liquid and fine powder are mixed, a lithium ion conductive solid electrolyte, or the like can be used.

Furthermore, for the purpose of improving charge-discharge cycle properties, a compound that promotes stable film formation on a surface of the negative electrode active material can be appropriately contained in the electrolyte described above. For example, vinylene carbonate (VC), fluorobenzene, fluorinated carbonate such as cyclic fluorinated carbonate (such as fluoroethylene carbonate (FEC), trifluoropropylene carbonate (TFPC) etc.) and chain fluorinated carbonate (such as trifluorodimethyl carbonate (TFDMC), trifluorodiethyl carbonate (TFDEC) and trifluoroethyl methyl carbonate (TFEMC) etc.) are effective. In addition, cyclic fluorinated carbonate and chain fluorinated carbonate can also be used as a solvent, such as ethylene carbonate.

A separator is disposed between a positive electrode plate and a negative electrode plate as described above to form a battery structure. If such a battery structure is wound or folded and then incorporated into a cylindrical battery case or a square battery case. After that, the electrolyte is injected thereto, and the lithium ion battery is completed.

After the battery structures are laminated into a bicell structure, the resulting material is impregnated into an organic electrolyte, and the thus obtained material is put into a pouch and sealed, and then the lithium ion polymer battery is completed.

In one aspect of the polysilsesquioxane covering silicon nanoparticle calcined product formed by heat treatment to the polysilsesquioxane covering silicon nanoparticle, the polysilsesquioxane covering silicon nanoparticle-calcined product has features that, in the spectrum measured by the infrared spectroscopy, when the intensity of the maximum absorption peak (peak 1) within the absorption band of 820 to 920 $cm^{-1}$ derived from the Si—H bond is $I_1$, and the intensity of the maximum absorption peak (peak 2) within the absorption band of 1000 to 1250 $cm^{-1}$ derived from the Si—O—Si bond is $I_2$, the intensity ratio ($I_1/I_2$) is in the range of 0.01 to 0.35, and the thickness of the covering is 1 nm or more and 30 nm or less. The lithium ion battery produced by using the negative electrode active material containing the polysilsesquioxane covering silicon nanoparticle calcined product has excellent cycle properties good initial charge-discharge efficiency and high capacity.

In one aspect of the polysilsesquioxane covering silicon nanoparticle calcined product of the present invention, in the spectrum measured by the infrared spectroscopy, in absorption bands at 1000 to 1250 $cm^{-1}$ derived from Si—O—Si bond, when an intensity of a maximum absorption peak (peak 2-1) in a wavelength of 1100 $cm^{-1}$ or higher is $I_{2-1}$ and an intensity of a maximum absorption peak (peak 2-2) in a wavelength of 1100 $cm^{-1}$ or lower is $I_{2-2}$, the intensity ratio ($I_{2-1}/I_{2-2}$) is greater than 1. The above features are similar to the features of the polysilsesquioxane covering silicon nanoparticle which is a precursor of the polysilsesquioxane covering silicon nanoparticle calcined product. The proportion of the cyclic bond is substantially maintained also after heat treatment, and therefore, the state of $I_{2-1}/I_{2-2}>1$ is also maintained.

In such a polysilsesquioxane covering silicon nanoparticle calcined product, the surface of the silicon nanoparticles and hydrogen polysilsesquioxane form a network through the strong chemical bond (the Si—O—Si bond) are indicated. The network is held even after the calcination, and a structure of the hydrogen polysilsesquioxane structure part plays a role of a buffer layer against the expansion and contraction of the silicon nanoparticles, and as a result, pulverization of the silicon nanoparticles caused by repeating the charge-discharge is expected to be suppressed.

EXAMPLES

Hereinafter, the present invention will be described more specifically by describing Examples and Comparative Examples, but the present invention is not limited to the Examples.

In the examples of this present invention, various analyses and evaluations were conducted on some samples of polysilsesquioxane covering silicon nanoparticles and calcined products thereof prepared in Examples 1 to 5 and Comparative Example 1.

Measuring devices and measuring methods used in "Measurement by Infrared Spectroscopy" and "Measurement by Elemental Analysis", "Observation and Photographing by Scanning Electron Microscope (SEM)" and "Observation, Photographing and Measurement of Covering Layer Thickness by Transmission Electron Microscope (TEM)" and "Evaluation of Battery Properties" in the Examples and Comparative Examples are as described below.

(Measurement by Infrared Spectroscopy)

With regard to measurement by the infrared spectroscopy, the measurement was carried out by using a Nicolet iS5 FT-IR made by Thermo Fisher Scientific K.K. as an infrared spectrometer, in measurement of transmission by a KBr method (resolution: 4 cm$^{-1}$, the number of times of scans: 16 times, data interval: 1.928 cm$^{-1}$, detector: DTGS KBr) on an intensity ($I_1$) of peak 1 in 820 to 920 cm$^{-1}$ derived from the Si—H bond and an intensity ($I_2$) of peak 2 in 1000 to 1250 cm$^{-1}$ derived from the Si—O—Si bond. In addition, each peak intensity was determined by connecting the starting point and the end point of a target peak by a straight line, partially correcting a baseline, and then measuring a height from the baseline to a peak top. Peaks derived from the Si—O—Si bond existed in two places, and therefore the peaks were separated, and the large intensity of the peak at about 1170 cm$^{-1}$ to 1230 cm$^{-1}$ was specified as $I_{2-1}$, and the large intensity of the peak at about 1070 cm$^{-1}$ was specified as $I_{2-2}$, and the intensity of the peak having higher intensity of the two peaks was specified as $I_2$.

(Measurement by Elemental Analysis)

The elemental composition analysis was conducted by compacting sample powder into a pellet form, and then irradiating the sample with the helium ion accelerated to 2.3 MeV and applying a Rutherford back scattering spectrometry (RBS)-hydrogen forward scattering spectrometry (HFS) method by which a high-accuracy composition value including a hydrogen is obtained, which is conducted by analyzing an energy spectrum of back scattered particles and an energy spectrum of a forward scattered hydrogen atom. The measurement was carried out under the conditions of incident ion: 2.3 MeV He, incident angle during RBS/HFS simultaneous measurement: 75 degrees, scattering angle: 160 degrees, sample current: 4 nA and beam diameter: 2 mmφ by using a measuring device, Pelletron 3SDH made by National Electrostatics Corporation.

(Observation and Photographing by Scanning Electron Microscope (SEM))

Sample powder was observed and photographed by an ultra-high resolution analytical scanning electron microscope (Hitachi, Ltd., Product name: SU-70).

(Observation, Photographing and Measurement of Covering Layer Thickness by Transmission Electron Microscope (TEM))

Sample was observed and photographed by a field emission type analytical transmission electron microscope (FEI Company, Tecnai G2 F20). The observation was carried out under the following conditions, the accelerating voltage: 200 kV and transmission electron microscope image: bright field. As pretreatment, the sample powder was embedded in a resin and sliced with an ultramicrotome.

As for the covering layer thickness, the thickness of each particles taken in the pictures by TEM was measured, and the average value of 10 particles was calculated.

(Evaluation of Battery Properties)

The charge-discharge properties etc. of the lithium ion secondary battery using the negative electrode active material containing the polysilsesquioxane covering silicon nanoparticle calcined product of the present invention were measured as described below.

By using a BTS 2005W made by NAGANO & Co., Ltd., the constant current charge was carried out on a Li electrode at a current of 100 mA per 1 g weight of the polysilsesquioxane covering silicon nanoparticle calcined product to reach a voltage of 0.001 V and then the constant voltage charge was carried out by maintaining a voltage of 0.001 V to reach a current value equal to or less than 20 mA per 1 g of the active material.

After a rest period of about 30 minutes, on the completely charged cell, the constant current discharge was carried out at a current of 100 mA per 1 g of the active material to reach a voltage of 1.5 V.

The charge capacity was calculated from an integral current value until the constant voltage charge was ended, and the discharge capacity was calculated from an integral current value until a battery voltage reached 1.5 V. At the time of switching the charge-discharge, the conditions of an open circuit for 30 minutes were kept.

The charge-discharge cycle properties were also measured under the similar conditions. The term of "Discharge Capacity at 50th Cycle" in table 1 means the discharge capacity at the 50th cycle when the flow of charge and discharge described above is 1 cycle. The charge-discharge efficiency is a ratio of the discharge capacity to the first charge capacity (at the first cycle). The capacity maintenance rate was taken as a ratio of discharge capacity at the 50th cycle of the charge-discharge to the first discharge capacity.

Example 1

(Preparation of Polysilsesquioxane Covering Silicon Nanoparticle Powder (1))

In a 100 mL poly beaker, 70 g of pure water and 20.5 g of a silicon nanopowder (S'tile, Si-10, average particle size of 100 nm, Particles with particle size of 1000 nm or more are not included.) were put, and then treated by using an ultrasonic homogenizer for 2 minutes to prepare aqueous silicon nanoparticle dispersion. Into a 1000 mL three-neck flask, the aqueous silicon nanoparticle dispersion, 3.24 g (31 mmol) of 35% by weight concentration hydrochloric acid and 247 g of pure water were added thereinto, the silicon fine nanoparticles was added dropwise into whole aqueous solution with stirring at room temperature for 10 minutes, and 60.0 g (366 mmol) of a triethoxysilane (Tokyo Chemical Industry Co., Ltd.) was dropping thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 µm, hydrophilic) to collect a solid. The solid was dried under reduced pressure at 80° C. for 10 hours to obtain 39.2 g of a polysilsesquioxane covering silicon nanoparticle powder (1).

(Preparation of Polysilsesquioxane Covering Silicon Nanoparticle Calcined Product (1))

On an alumina boat of an SSA-S grade, 10.0 g of the polysilsesquioxane covering silicon nanoparticle powder (1) was placed, and then the boat was set in a vacuum purging tube furnace KTF43N1-VPS (Koyo Thermo Systems Co., Ltd.). Then, as heat treatment conditions, while argon gas was fed at a flow rate of 250 mL per minute under the argon gas atmosphere (high-purity argon gas: 99.999%), and the temperature was raised at a rate of 4° C. per minute, and calcination was carried out at 900° C. for 1 hour to obtain a polysilsesquioxane covering silicon nanoparticle calcined product.

Then, the polysilsesquioxane covering silicon nanoparticle calcined product was ground and crushed with a mortar for 5 minutes, and the resulting material was classified using a stainless steel sieve having an opening of 32 µm to obtain 9.75 g of a polysilsesquioxane covering silicon nanoparticle calcined product (1) having a maximum particle size of 32 μm.

Figure 3:
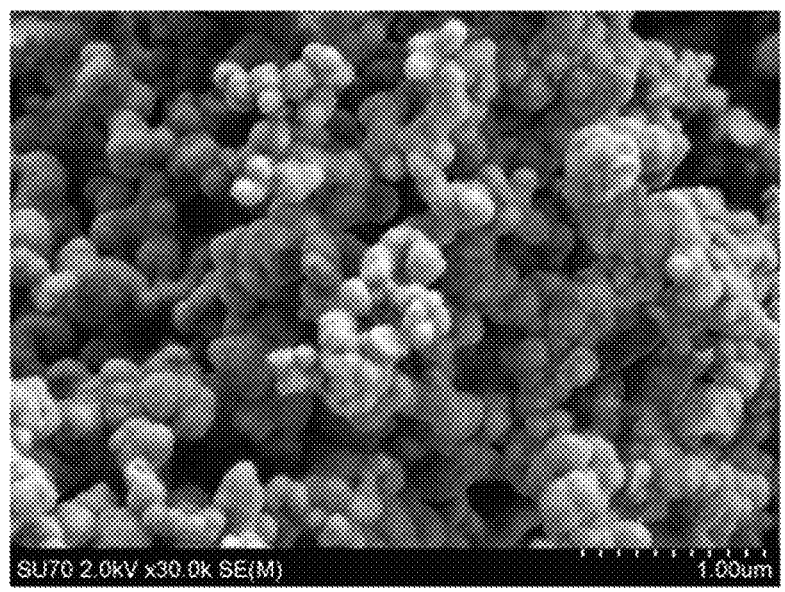
FIG. 3 shows a photograph of a scanning electron microscope (SEM) of the polysilsesquioxane covering silicon nanoparticle calcined product (1) obtained in Example 4.

The infrared spectroscopy spectrum of the polysilsesquioxane covering silicon nanoparticle calcined product (1) is shown in FIG. 1. A photograph by a transmission electron microscope (TEM) is shown in FIG. 2, and a photograph by an electron microscope (SEM) is shown in FIG. 3. The covering layer thickness was 26 nm.

(Preparation of Negative Electrode)

To 20 g of a 2% by weight carboxymethylcellulose aqueous solution, 3.0 g of the polysilsesquioxane covering silicon nanoparticle calcined product (1), 0.4 g of acetylene black made by Denka Company Limited and 0.2 g of carbon fiber from vapor phase (vapor-phase growth carbon fibers) VGCF-H (Showa Denko K.K.) were added and mixed for 15 minutes using a stirrer in the flask, and then distilled water was added so as for the solid content concentration to be 15% by weight, and the resultant mixture was further stirred for 15 minutes to prepare a slurry composition. The slurry composition was transferred to a thin-film spin system high-speed mixer (FILMIX Model 40-40) made by PRIMIX Corporation, and was stirred and dispersed at a rotation speed of 20 m/s for 30 seconds. The slurry obtained after the dispersion treatment was coated on a copper foil at a thickness of 200 μm by a doctor blade method.

After coating, the resultant material was dried for 90 minutes on a hot plate at 80° C. After drying, a negative electrode sheet was pressed by a 2-ton small precision roll press (THANK-METAL Co., LTD.). After the press, the electrode sheet was punched with an electrode punch HSNG-EP having φ14.50 mm, and then was dried under a reduced pressure at 80° C. for 16 hours in a glass tube oven GTO-200 (SIBATA SCIENTIFIC TECHNOLOGY LTD.) to manufacture a negative electrode.

(Production and Evaluation of Lithium Ion Battery)

Figure 4:
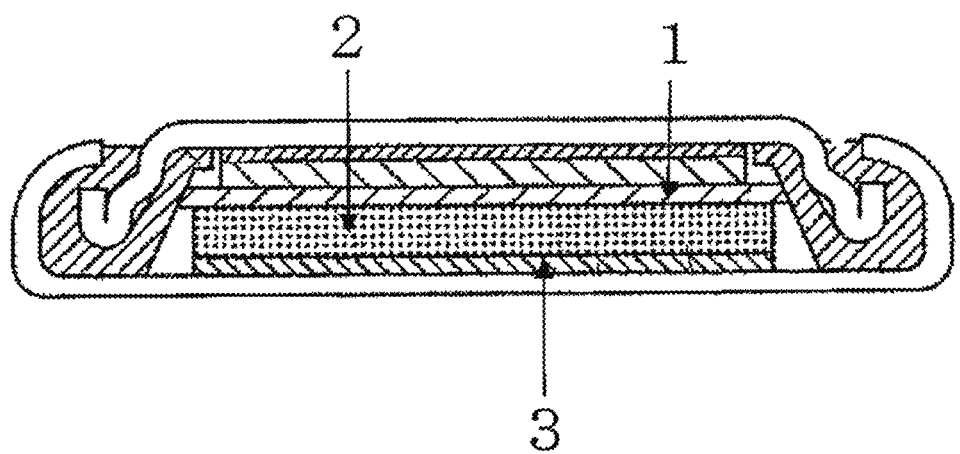
FIG. 4 is a diagram showing a configuration example of a coin-type lithium ion cell.

A 2032 type coin cell having a structure shown in FIG. 4 was produced. The negative electrode obtained above was used as negative electrode 1, a lithium metal was used as counter electrode 3, and a microporous polypropylene film was used as separator 2, respectively. An electrolyte prepared by adding 5% by weight of a fluoroethylene carbonate to a mix solvent of ethylene carbonate and diethyl carbonate of 1:1 (volume ratio) in which $LiPF_6$ were dissolved at a rate of 1 mol/L was used.

Then, the battery properties of the lithium ion battery were evaluated by the methods described above.

Example 2

(Preparation of Polysilsesquioxane Covering Silicon Nanoparticle Powder (2))

In a 100 mL poly beaker, 50 g of pure water and 13.58 g of a silicon nanopowder (S'tile, Si-10, average particle size of 100 nm, Particles with particle size of 1000 nm or more are not included.) were put, and then treated by using an ultrasonic homogenizer for 2 minutes to prepare aqueous silicon nanoparticle dispersion. Into a 500 mL three-neck flask, the aqueous silicon nanoparticle dispersion, 2.22 g (21 mmol) of 35% by weight concentration hydrochloric acid and 161 g of pure water were charged thereinto, the silicon fine nanoparticles was dispersed into whole aqueous solution with stirring at room temperature for 10 minutes, and 19.9 g (121 mmol) of a triethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 μm, hydrophilic) to collect a solid. The solid obtained was dried under reduced pressure at 80° C. for 10 hours to obtain 20.0 g of a polysilsesquioxane covering silicon nanoparticle powder (2).

(Preparation of Polysilsesquioxane Covering Silicon Nanoparticle Calcined Product (2))

The calcined product was prepared in a manner which is the same as Example 1 by using 10.0 g of the polysilsesquioxane covering silicon nanoparticle powder (2), and then 9.82 g of a polysilsesquioxane covering silicon nanoparticle calcined product (2) was obtained. The infrared spectroscopy spectrum of the polysilsesquioxane covering silicon nanoparticle calcined product (2) is shown in FIG. 1. The covering layer thickness of the polysilsesquioxane covering silicon nanoparticle calcined product (2) photographed by a transmission electron microscope was 10 nm.

(Preparation of Negative Electrode, and Preparation and Evaluation of Lithium Ion Battery)

A negative electrode was produced by using the polysilsesquioxane covering silicon nanoparticle calcined product (2) in a manner which is the same as Example 1, and the battery properties of a lithium ion battery including the negative electrode were evaluated.

Example 3

(Preparation of Polysilsesquioxane Covering Silicon Nanoparticle Powder (3))

In a 100 mL poly beaker, 50 g of pure water and 17.6 g of a silicon nanopowder (S'tile, Si-10, average particle size of 100 nm, Particles with particle size of 1000 nm or more are not included.) were put, and then treated by using an ultrasonic homogenizer for 2 minutes to prepare aqueous silicon nanoparticle dispersion. Into a 500 mL three-neck flask, the aqueous silicon nanoparticle dispersion, 1.67 g (28 mmol) of acetic acid (Wako Pure Chemical Industries, Ltd.: special grade reagent) and 223 g of pure water were charged thereinto, the silicon fine nanoparticles was dispersed into whole aqueous solution with stirring at room temperature for 10 minutes, and 7.36 g (44.9 mmol) of a triethoxysilane (Tokyo Chemical Industry Co., Ltd.) was dropping thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 μm, hydrophilic) to collect a solid. The solid obtained was dried under reduced pressure at 80° C. for 10 hours to obtain 20.0 g of a polysilsesquioxane covering silicon nanoparticle powder (3).

(Preparation of Polysilsesquioxane Covering Silicon Nanoparticle Calcined Product (3))

The calcined product was prepared in a manner which is the same as Example 1 by using 10.0 g of the polysilsesquioxane covering silicon nanoparticle powder (3), and then 9.88 g of a polysilsesquioxane covering silicon nanoparticle calcined product (3) was obtained. The covering layer thickness of the polysilsesquioxane covering silicon nanoparticle calcined product (3) photographed by a transmission electron microscope was 3 nm.

(Preparation of Negative Electrode, and Preparation and Evaluation of Lithium Ion Battery)

A negative electrode was produced by using the polysilsesquioxane covering silicon nanoparticle calcined product (3) in a manner which is the same as Example 1, and the battery properties of a lithium ion battery including the negative electrode were evaluated.

Example 4

(Preparation of Polysilsesquioxane Covering Silicon Nanoparticle Powder (4))

In a 100 mL poly beaker, 50 g of pure water and 15.5 g of a silicon nanopowder (Nanomakers, Pure Si NM Si 99, average particle size of 75 nm, Particles with particle size of 1000 nm or more are not included.) were put, and then treated by using an ultrasonic homogenizer for 2 minutes to prepare aqueous silicon nanoparticle dispersion. Into a 500 mL three-neck flask, the aqueous silicon nanoparticle dispersion, 2.54 g (24 mmol) 35% by concentration hydrochloric acid and 190 g of pure water were charged thereinto, the silicon nanoparticles was dispersed into whole aqueous solution with stirring at room temperature for 10 minutes, and 13.9 g (85 mmol) of a triethoxysilane (Tokyo Chemical Industry Co., Ltd.) was added dropwise thereto at 25° C. under stirring. After completion of dropwise addition, the hydrolysis reaction and the condensation reaction were carried out at 25° C. for 2 hours while the mixture was stirred.

After elapse of the reaction time, reaction products were filtrated by a membrane filter (pore size: 0.45 μm, hydrophilic) to collect a solid. The solid obtained was dried under reduced pressure at 80° C. for 10 hours to obtain 20.0 g of a polysilsesquioxane covering silicon nanoparticle powder (4).

(Preparation of Polysilsesquioxane Covering Silicon Nanoparticle Calcined Product (4))

The calcined product was prepared in a manner which is the same as Example 1 by using 10.0 g of the polysilsesquioxane covering silicon nanoparticle powder (4), and then 9.81 g of a polysilsesquioxane covering silicon nanoparticle calcined product (4) was obtained. The covering layer thickness of the polysilsesquioxane covering silicon nanoparticle calcined product (4) photographed by a transmission electron microscope was 5 nm.

(Preparation of Negative Electrode, and Preparation and Evaluation of Lithium Ion Battery)

A negative electrode was produced by using the polysilsesquioxane covering silicon nanoparticle calcined product (4) in a manner similar to Example 1, and the battery properties of a lithium ion battery including the negative electrode were evaluated.

Example 5

The amount of 9.84 g of a polysilsesquioxane covering silicon nanoparticle (5) was obtained by the heat treatment which is the same as Example 4 except that the above mentioned silicon nanopowder is changed to NM SiΩC99 manufactured by Nanomakers (average particle size of 75 nm, Particles with particle size of 1000 nm or more are not included.). The thickness of the covering layer of the polysilsesquioxane covering silicon nanoparticle calcined product (5), obtained with the transmission electron microscope was 5 nm.

(Preparation of Negative Electrode, and Preparation and Evaluation of Lithium Ion Battery)

A negative electrode was produced by using the polysilsesquioxane covering silicon nanoparticle calcined product (5) in a manner which is the same as Example 1, and the battery properties of a lithium ion battery including the negative electrode were evaluated.

The results of the infrared spectroscopy measurement and the elemental analysis of polysilsesquioxane covering silicon nanoparticle calcined products obtained in Examples 1 to 5 of the present invention and the evaluation results of the battery properties using the negative electrodes produced by using the negative electrode active materials are shown in Table 1.

Comparative Example 1

A silicon monoxide powder having a maximum particle size of 20 μm by classifying commercially available silicon monoxide (Sigma-Aldrich Corp., under 325 mesh) by using a stainless steel sieve having an opening of 20 μm was used as a silicon oxide. A silicon nanoparticle mix silicon oxide (1) was obtained by ball milling for 10 minutes with a planetary ball mill using a zirconia container and a zirconia ball to mix 4.41 g of the silicon monoxide of 20 μm or less with 11.2 g of the silicon nanopowder (Nanomakers, Pure Si NM Si99, average particle size of 75 nm). The amount of 5 g of a 2% by weight aqueous solution of carboxymethyl cellulose was added to the silicon nanoparticle mix silicon oxide (1), and conducted ball milling treatment for 2 hours with a planetary ball mill using a zirconia container and a zirconia ball, and then dried at 100° C. for 8 hours in a vacuum dryer to remove moisture. Then, the amount of 15.6 g of a silicon nanoparticle complex silicon oxide (1) was obtained. The infrared spectroscopy spectrum of the silicon nanoparticle complex silicon oxide (1) is shown in FIG. 1.

(Preparation of Negative Electrode)

A negative electrode was produced in a manner which is the same as Example 2 expect that the silicon nanoparticle complex silicon oxide (1) of Comparative Example 1 was used.

(Preparation and Evaluation of Lithium Ion Battery)

A lithium ion battery was produced by the same method using the polysilsesquioxane covering silicon nanoparticle calcined product (1) of Example 1, except that the negative electrode produced from the above silicon nanoparticle complex silicon oxide (1) as a negative electrode is used, and the battery properties were evaluated.

TABLE 1

| | Coating Thickness | Calcination Temperature | IR Peak Ratio | | Initial Charge Capacity | Initial Discharge Capacity | Initial Charge-Discharge Efficiency | Discharge Capacity at 50th Cycle | Capacity Maintenance Rate |
|---|---|---|---|---|---|---|---|---|---|
| | nm | ° C. | $I_1/I_2$ | $I_{2-1}/I_{2-2}$ | mAh/g | mAh/g | % | mAh/g | % |
| Example 1 | 26 | 900 | 0.07 | 1.15 | 2620 | 2196 | 83.8 | 2016 | 91.8 |
| Example 2 | 10 | 900 | 0.04 | 1.34 | 2992 | 2561 | 85.6 | 2244 | 87.6 |

TABLE 1-continued

|  | Coating Thickness | Calcination Temperature | IR Peak Ratio | | Initial Charge Capacity | Initial Discharge Capacity | Initial Charge-Discharge Efficiency | Discharge Capacity at 50th Cycle | Capacity Maintenance Rate |
|---|---|---|---|---|---|---|---|---|---|
|  | nm | °C. | $I_1/I_2$ | $I_{2-1}/I_{2-2}$ | mAh/g | mAh/g | % | mAh/g | % |
| Example 3 | 3 | 900 | 0.07 | 1.52 | 3270 | 2959 | 90.5 | 2430 | 82.1 |
| Example 4 | 5 | 900 | 0.06 | 1.42 | 3095 | 2677 | 86.5 | 2273 | 84.9 |
| Example 5 | 5 | 800 | 0.11 | 1.45 | 3120 | 2686 | 86.1 | 2302 | 85.7 |
| Comparative Example 1 | — | — | 0 | — | 3150 | 2709 | 86.0 | 1295 | 47.8 |

According to the results of the Examples, all the negative electrode active material for the lithium ion battery produced from the calcined product obtained by heat treatment to the polysilsesquioxane covering silicon nanoparticle including the silicon nanoparticle a volume-basis mean particle size of more than 10 nm and less than 500 nm and having no particle having a particle size of 1000 nm or more and the polysilsesquioxane covering the silicon nanoparticle and chemically bonding to the surface of the silicon nanoparticle, wherein the polysilsesquioxane covering silicon nanoparticle has a Si—H bond and wherein a thickness of the polysilsesquioxane observed with a transmission electron microscope (TEM) of 1 nm or more and 30 nm or less, have much higher initial discharge capacity and much higher discharge capacity at 50th cycle than the conventional carbon-based negative electrode active materials, reduction in capacity decrease due to the charge-discharge cycle, and high capacity maintenance rate. Therefore, by heat treatment to the specific polysilsesquioxane covering silicon nanoparticle, the resultant material can sufficiently endure practicality as a negative electrode active material for lithium ion battery and receive high evaluation as a useful compound capable of being a material which is available as a negative electrode material of new battery requiring high capacity.

As shown in Comparative Example 1, the battery properties of the battery including the negative electrode using the negative electrode active material produced from the silicon oxide having no chemical bond on the surface of silicon nanoparticle and no Si—H bond provided a certain level on the initial charge-discharge efficiency but the capacity decreased rapidly was observed, compared with the battery properties of the battery including the negative electrode active material of the present invention produced in the same conditions. Therefore, this lithium ion battery did not reach the level of the practical use.

INDUSTRIAL APPLICABILITY

By using the negative electrode active material for the lithium secondary ion battery including the polysilsesquioxane covering the silicon nanoparticle obtained in the present invention, the lithium ion battery having greatly higher capacity, practical initial charge-discharge efficiency and cycle properties compared with the conventional carbon-base negative electrode can be obtained. For example, the present invention is useful technique for a field of batteries, in particular, for the field of secondary batteries.

The invention claimed is:

1. A calcined product of polysilsesquioxane covered silicon nanoparticles comprising
   silicon nanoparticles having a volume-basis mean particle size of more than 10 nm and less than 500 nm and having no particle having a particle size of 1000 nm or more, and
   a polysilsesquioxane covering the silicon nanoparticles and being chemically bonded to a surface of each of the silicon nanoparticles,
   wherein each of the polysilsesquioxane covered silicon nanoparticles has a Si—H bond, and
   wherein a thickness of the polysilsesquioxane observed with a transmission electron microscope is 1 nm or more and 30 nm or less.

2. The calcined product of the polysilsesquioxane covered silicon nanoparticles according to claim 1, wherein within an absorption band of 1000 to 1250 $cm^{-1}$ derived from a Si—O—Si bond when an intensity of a maximum absorption peak in a wavelength of 1100 $cm^{-1}$ or higher is $I_{2-1}$, and an intensity of a maximum absorption peak in a wavelength of 1100 $cm^{-1}$ or lower is $I_{2-2}$ in a spectrum obtained by measuring the polysilsesquioxane covered silicon nanoparticles by an infrared spectroscopy, an intensity ratio $I_{21}/I_{2-2}$ is greater than 1.

3. The calcined product of the polysilsesquioxane covered silicon nanoparticles according to claim 1, wherein when an intensity of a maximum absorption peak within an absorption band of 820 to 920 $cm^{-1}$ derived from a Si—H bond is $I_1$ and an intensity of a maximum absorption peak within an absorption band in 1000 to 1250 $cm^{-1}$ derived from a Si—O—Si bond is $I_2$ in an spectrum obtained by measuring the polysilsesquioxane covered silicon nanoparticles by an infrared spectroscopy, an intensity ratio $I_1/I_2$ is in a range of from 0.01 to 0.35.

4. A negative electrode active material for a lithium ion battery comprising the calcined product of the polysilsesquioxane covered silicon nanoparticles according to claim 1.

5. A negative electrode for a lithium ion battery comprising the negative electrode active material for a lithium ion battery according to claim 4.

6. A lithium ion battery comprising the negative electrode for a lithium ion battery according to claim 5.

7. A method for producing polysilsesquioxane covered silicon nanoparticles,
   wherein the polysilsesquioxane covered silicon nanoparticles have silicon nanoparticles having a volume-basis mean particle size of more than 10 nm and less than 500 nm and has no particle having a particle size of 1000 nm or more and
   a polysilsesquioxane covering the silicon nanoparticles and being chemically bonded to a surface of each of the silicon nanoparticles,
   wherein each of the polysilsesquioxane covered silicon nanoparticles has a Si—H bond, and
   wherein a thickness of the polysilsesquioxane observed with a transmission electron microscope is 1 nm or more and 30 nm or less;
   the method comprising:

hydrolyzing and condensation reacting a silicon compound represented by a formula (1) in the presence of the silicon nanoparticles:

$$HSi(R)_3 \qquad (1)$$

wherein R is a group selected from the group consisting of a halogen atom, a hydrogen atom, a substituted or unsubstituted alkoxy group having 1 to 10 carbons, a substituted or unsubstituted aryloxy group having 6 to 20 carbons and a substituted or unsubstituted arylalkoxy group having 7 to 30 carbons, R may be identical to or different from each other, provided that in the substituted or unsubstituted alkoxy group having 1 to 10 carbons, the substituted or unsubstituted aryloxy group having 6 to 20 carbons and the substituted or unsubstituted arylalkoxy group having 7 to 30 carbons, a hydrogen atom may be optionally replaced by a halogen atom.

8. A method for producing a calcined product of a polysilsesquioxane covered silicon nanoparticles, comprising conducting calcination under an non-oxidizing atmosphere, after hydrolyzation and condensation reaction in the method for producing the polysilsesquioxane covered silicon nanoparticles according to claim 7.

9. Polysilsesquioxane covered silicon nanoparticles comprising
  silicon nanoparticles having a volume-basis mean particle size of more than 10 nm and less than 500 nm and having no particle having a particle size of 1000 nm or more, and
  a polysilsesquioxane covering the silicon nanoparticles and being chemically bonded to a surface of each of the silicon nanoparticles,
  wherein each of the polysilsesquioxane covered silicon nanoparticles has a Si—H bond, and
  wherein a thickness of the polysilsesquioxane observed with a transmission electron microscope is 1 nm or more and 30 nm or less.

10. The polysilsesquioxane covered silicon nanoparticles according to claim 9, wherein within an absorption band of 1000 to 1250 cm$^{-1}$ derived from a Si—O—Si bond when an intensity of a maximum absorption peak in a wavelength of 1100 cm$^{-1}$ or higher is $I_{2\text{-}1}$, and an intensity of a maximum absorption peak in a wavelength of 1100 cm$^{-1}$ or lower is $I_{2\text{-}2}$ in a spectrum obtained by measuring the polysilsesquioxane covered silicon nanoparticles by an infrared spectroscopy, an intensity ratio $I_{2\text{-}1}/I_{2\text{-}2}$ is greater than 1.

* * * * *